United States Patent
Huang et al.

(10) Patent No.: US 9,642,062 B2
(45) Date of Patent: May 2, 2017

(54) METHOD, SYSTEM AND NETWORK DEVICE FOR OBTAINING CELL RESELECTION PRIORITY

(75) Inventors: Yinghua Huang, Shenzhen (CN); Boyun Xie, Shenzhen (CN); Zuoyan Zhu, Shenzhen (CN); Mingjiang Xie, Shenzhen (CN); Xiaofei Ma, Shenzhen (CN); Wen Gao, Shenzhen (CN); Xiaoying Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 12/829,981

(22) Filed: Jul. 2, 2010

(65) Prior Publication Data
US 2010/0273485 A1    Oct. 28, 2010

Related U.S. Application Data

(63) Continuation of application No. PCT/CN2008/073891, filed on Dec. 31, 2008.

(30) Foreign Application Priority Data

Jan. 4, 2008 (CN) .......................... 2008 1 0002818

(51) Int. Cl.
*H04W 36/34* (2009.01)
*H04J 11/00* (2006.01)
(Continued)

(52) U.S. Cl.
CPC .......... *H04W 36/34* (2013.01); *H04J 11/0069* (2013.01); *H04W 36/24* (2013.01); *H04W 48/16* (2013.01)

(58) Field of Classification Search
USPC .......................... 455/436–444; 370/331–333
See application file for complete search history.

(56) References Cited

U.S. PATENT DOCUMENTS

2006/0183482 A1* 8/2006 Ueda .............................. 455/439
2008/0130578 A1* 6/2008 Wang .................... H04W 48/10
                                                        370/331
(Continued)

FOREIGN PATENT DOCUMENTS

CN    1255270 A    5/2000
CN    1822700 A    8/2006
(Continued)

OTHER PUBLICATIONS

3GPP TS 36.304 V1.2.0: "3rd Generation Partnership Project; Technical Specification Group Radio Access Network; Evolved Universal Terrestrial Radio Access (E-UTRA) User Equipment (UE) procedures in idle mode (Release 8)," dated Oct. 2007, total 27 pages.

(Continued)

*Primary Examiner* — Vladimir Magloire
*Assistant Examiner* — David Orange
(74) *Attorney, Agent, or Firm* — Slater Matsil, LLP

(57) ABSTRACT

A method, a system, and a network device for obtaining cell reselection priority are disclosed. The method includes: The network obtains information for calculating priority; and the network determines a terminal-specific private priority list according to the information, and delivers the determined private priority list specific to the terminal through special signaling; or the terminal obtains all or part of the information for calculating priority from the network, and determines its private priority list according to the obtained information; or both the network and the terminal determine the terminal-specific private priority list according to the information.

1 Claim, 3 Drawing Sheets

(51) Int. Cl.
*H04W 36/24* (2009.01)
*H04W 48/16* (2009.01)

(56) References Cited

U.S. PATENT DOCUMENTS

2008/0176564 A1* 7/2008 Eerolainen .................... 455/436
2010/0216469 A1* 8/2010 Yi et al. .................... 455/435.3

FOREIGN PATENT DOCUMENTS

| CN | 1852559 A | 10/2006 |
|---|---|---|
| CN | 1832622 A | 9/2009 |
| EP | 0862346 A2 | 9/1998 |
| KR | 20040069358 A | 8/2004 |
| KR | 10-2006-0046937 A | 5/2006 |

OTHER PUBLICATIONS

Ericsson: "Intra-LTE Cell Reselection Methods to Support Camp Load Balancing," R2-074687, 3GPP TSG-RAN WG2 Meeting #60, Jeju, Korea, Nov. 5-9, 2007, total 2 pages.
Nokia et al.: "E-UTRA Inter-Frequency Cell Reselection Aspects", R2-074876, 3GPP TSG-RAN WG2 Meeting #60, Jeju, Korea, Nov. 5-9, 2007, total 10 pages.
LG Electronics Inc.: "Inter-frequency Load Balancing", R2-075041, 3GPP TSG-RAN WG2 #60, Jeju, Korea, Nov. 5-9, 2007, total 3 pages.
Chinese office action issued in corresponding Chinese patent application No. 200810002818.1, dated Oct. 23, 2009, total 30 pages.
Chinese office action issued in corresponding Chinese patent application No. 200810002818.1, dated Apr. 21, 2010, total 14 pages.
NTT DoCoMo Inc.: "IDLE mode mobility control principles," XP0510136641, 3GPP TSG RAN WG2 #59 bits, Shanghai, China, dated Oct. 8-12, 2007, total 8 pages.
Nokia et al. : "E-UTRA cell selection and cell reselection aspects," XP050136308, 3GPP TSG-RAN W2 Meeting #59, Athens, Greece, dated Aug. 20-24, 2007, total 12 pages.
Hasswa et al.: "Generic vertical handoff decision function for heterogeneous wireless networks," XP010801891, dated Mar. 6, 2005, total 5 pages.
European search report issued in corresponding European Patent application No. EP08869377.5, dated Mar. 4, 2010, total 9 pages.
Written Opinion issued in corresponding PCT application No. CT/CN2008/073891, dated Apr. 2, 2009, total 6 pages.
First Office Action of corresponding Korean Patent Application No. KR10-2010-7013018, mailed on Jul. 7, 2011, 7 pages total.
3GPP TSG RAN2#59 R2-073117: "Way forward on 'subscriber type' indication via S1 for RRM", Athens, Greece, dated Aug. 19-25, 2007, 2 pages total.
Second Office Action of corresponding Korean Patent Application No. KR10-2010-7013018, mailed on Mar. 26, 2012, and English translation thereof, 5 pages total.

* cited by examiner

METHOD, SYSTEM AND NETWORK DEVICE FOR OBTAINING CELL RESELECTION PRIORITY

CROSS-REFERENCE TO THE RELATED APPLICATIONS

This application is a continuation of international patent application PCT/CN2008/073891, entitled "Method, System and Network Device for Obtaining Cell Reselection Priority", which claims priority to Chinese Patent Application No. 200810002818.1, filed with the Chinese Patent Office on Jan. 4, 2008 and entitled "Method and System for Obtaining Cell Reselection Priority", which are hereby incorporated by reference in their entities.

FIELD OF THE INVENTION

The present invention relates to communication technologies, and in particular, to a method, a system, and a network device for obtaining cell reselection priority.

BACKGROUND

With the development of mobile communication technologies, more and more mobile communication systems come forth, for example, Global System For Mobile Communication (GSM) which is also known as the $2^{nd}$ Generation (2G) mobile communication system; Wideband Code Division Multiple Access (WCDMA), Code Division Multiple Access 2000 (CDMA2000), and Time Division-Synchronous CDMA (TD-SCDMA), which are also known as the $3^{rd}$ Generation (3G) mobile communication systems; and the systems currently under development such as Long Term Evolution (LTE) and World Interoperability for Microwave Access (WiMAX). If different systems coexist, when a moving terminal performs cell reselection, multiple frequencies within a system and the cells of multiple systems are available for selection. Therefore, it is important to reselect a proper cell, reduce the time and processing power associated with measurement, and reduce mobile terminal power consumption.

SUMMARY

A method for obtaining cell reselection priority is disclosed in an embodiment of the present invention. The method includes:

a network obtaining information for calculating priority; and the network determining a private priority list specific to a terminal according to the information, and delivering the determined private priority list specific to the terminal through special signaling; or the terminal obtaining all or part of the information for calculating the priority from the network, and determining the private priority list specific to the terminal according to the obtained information; or the network and the terminal determining the private priority list specific to the terminal according to the obtained information.

A system for obtaining cell reselection priority is disclosed in an embodiment of the present invention. The system includes:

a network-side entity, adapted to: obtain information for calculating priority, determine a public priority list and a terminal-specific private priority list according to the information, and deliver the public priority list and the private priority list specific to the terminal.

A network device is disclosed in an embodiment of the present invention. The network device includes:

an information obtaining unit, adapted to obtain information for calculating priority;

a priority determining unit, adapted to determine a private priority list according to the information obtained by the information obtaining unit; and a priority delivering unit, adapted to deliver the private priority list.

The technical solution under the present invention reveals that: In the embodiments of the present invention, a network and/or a terminal determines the private priority of the cell, frequency, or system; and when the network determines the private priority, the network delivers the determined private priority list specific to the terminal through special signaling. When the terminal and/or the network determines the private priority, the network delivers the information about the determined priority or the independently determined private priority list specific to the terminal; and the terminal can determine a private priority list according to the information or the private priority list determined by the network in view of the information stored by the terminal. Therefore, relevant information is provided for the processes such as cell reselection and cell search, the power consumption caused by terminal measurement is reduced, and energy efficiency is accomplished. When cell reselection is required, the terminal evaluates cell reselection to determine the cell to be reselected according to the private priority list of the cell, frequency or system, the exclusive conditions which currently affect cell reselection, or further according to the public priority list. In this way, the terminal can select a proper cell.

DETAILED DESCRIPTION

Figure 1:
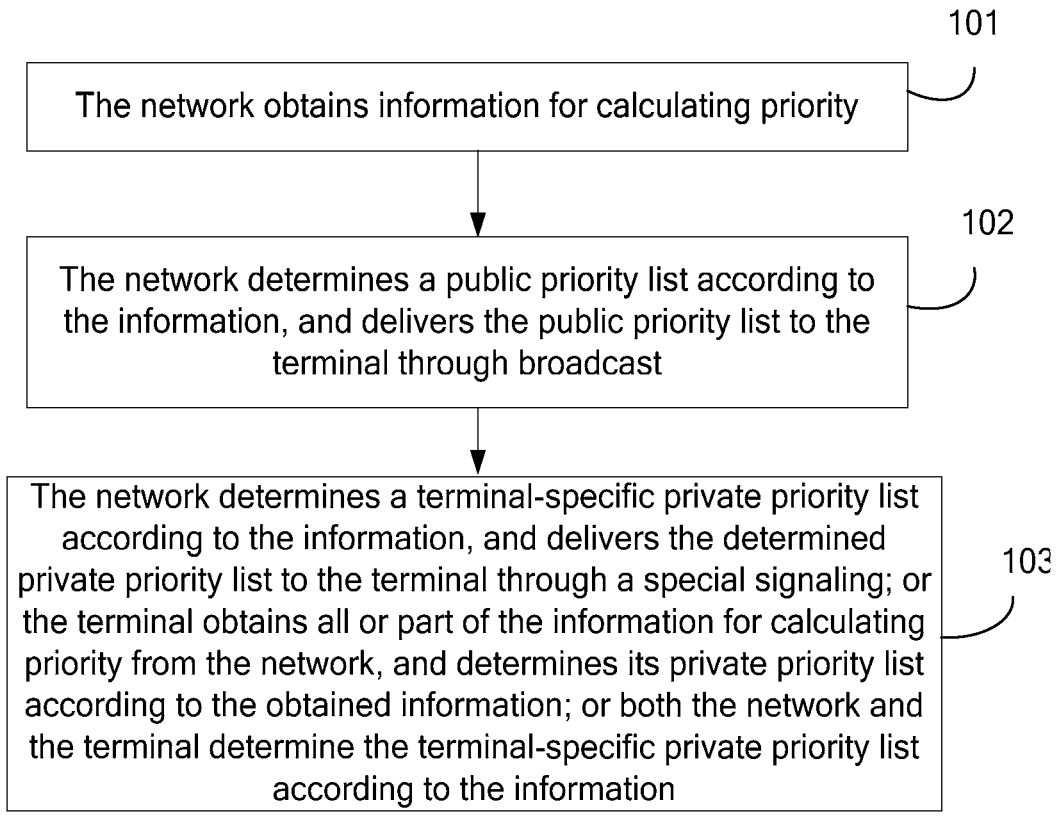
FIG. 1 is a flowchart of a method for a terminal to obtain cell reselection priority in an embodiment of the present invention.

In order to make the technical solution under the present invention clearer, the present invention is hereinafter described in detail by reference to accompanying drawings and preferred embodiments.

In an LTE system, the reselection of different-frequency and different-system cells is principally based on priority. The corresponding priority is formulated for different frequencies and systems. When the terminal performs cell reselection, the terminal decides to reside on a specific cell according to priority. That is, the terminal measures the frequency or system of higher priority first. If the cell of the frequency or system of higher priority meets the cell reselection conditions, the terminal reselects the cell; otherwise, the terminal measures the cell of lower priority. When the terminal resides on a lower-priority cell, the terminal measures the cell of the frequency of system of higher priority periodically. If the higher-priority cell meets the reselection conditions, the terminal reselects the higher-priority cell.

Priority falls into two types: public priority and private priority. Public priority refers to the priority which is specific to a cell, frequency or system and is the same to all terminals in a cell. Private priority refers to priority specific to a terminal. Different terminals in a cell may have different private priority.

In the embodiments of the present invention, a priority level may be assigned to each frequency layer or system adjacent to the serving cell, thus generating a private priority list and a public priority list.

The priority of a cell, frequency, or system depends on many factors. For example, in an LTE system, the factors include but are not limited to:

terminal capability: This information may be stored on the core network and the terminal;

cell bandwidth: This information may be stored on an evolved Node B (eNB);

subscription information: This information may be stored on the core network and the terminal;

service provider policy: This information may be stored on the core network and the eNB;

history service information: This information may be stored on the core network and the terminal;

mobility or history mobility information: This information may be stored on the terminal;

residing load: This information may be stored on the eNB;

service load: This information may be stored on the eNB;

whether the network is shared: This information may be stored on the core network;

whether the cell supports broadcast and multicast services; or whether the base station is a home base station;

or any combination of any of the foregoing.

Such information may be stored on different network entities or terminals. Therefore, the method and the system for obtaining cell reselection priority under the present invention may be implemented in different ways.

In the embodiments of the present invention, a network and/or a terminal determines the private priority of the cell, frequency, or system; and, when the network determines the private priority, the network delivers the determined private priority list specific to the terminal through special signaling.

A system for obtaining cell reselection priority in a first embodiment of the present invention includes:

a network-side entity, adapted to: obtain information for calculating priority, and determine a public priority list and a terminal-specific private priority list according to the obtained information, then deliver the public priority list to the terminal through broadcast channel and deliver the private priority list specific to the terminal through special signaling; and a terminal, adapted to receive the public priority list and the private priority list.

For an LTE system, the network-side entity that determines the public priority list may be an eNB, and the network-side entity that determines the private priority list may be an eNB or a Mobile Management Entity (MME).

In this embodiment, the terminal may be further adapted to determine a new private priority list according to the existing private priority list and the information stored in the terminal for calculating priority.

A system for obtaining cell reselection priority in a second embodiment of the present invention includes:

a network-side entity, adapted to: obtain information for calculating priority, and deliver all or part of the information to the terminal through broadcast channel and/or a special signaling; and a terminal, adapted to: receive the information for calculating priority, and determine a private priority list according to the received information and the information stored in the terminal for calculating priority.

In this embodiment, the network-side entity may be further adapted to: determine a public priority list according to the obtained information for calculating priority, and deliver the public priority list to the terminal through broadcast channel.

The network-side entity may also be adapted to notify the terminal of the algorithm for calculating the priority so that the terminal can determine the private priority list according to the algorithm when delivering all or part of the information to the terminal.

In this embodiment, the network-side entity includes an eNB and/or an MME.

A method for obtaining cell reselection priority is disclosed in an embodiment of the present invention. As shown in FIG. 1, the method includes the following:

Block 101: The network obtains the information for calculating priority. The information may be one of or any combination of the information items listed above.

Block 102: The network determines a public priority list according to the obtained information, then delivers the public priority list to a terminal through broadcast channel. This block is optional.

The network-side eNB may calculate the public priority of the cell, frequency or system according to the information, for example, cell bandwidth, and service provider policy, for calculating priority, and generate a public priority list and deliver it to the terminal. The features of different systems may be considered in calculating the public priority, for example, the order of priority of different systems may be set to: LTE>WCDMA>GSM.

Block 103: The network determines a terminal-specific private priority list according to the information, and delivers the determined private priority list specific to the terminal through special signaling. Alternatively, the terminal obtains all or part of the information for calculating priority from the network, and determines its private priority list according to the obtained information. Or, the network and the terminal determine the terminal-specific private priority list according to the obtained information.

The process of the network determining the private priority, the process of the terminal determining the private priority, and the process of the network and the terminal determining the private priority are detailed below, taking an LTE system as an example.

I. The network-side eNB determines the private priority.

When the terminal enters the Radio Resource Control Connected (RRC_CONNECTED) state, the eNB obtains the information for calculating priority. The information includes the information stored by the eNB and the information obtained from the MME. The information stored by the eNB includes the cell bandwidth information; and the information obtained by the eNB from the MME includes: terminal capability, subscription information, service provider policy, history service information, and whether the network is shared. According to such information, the eNB calculates and generates a private priority list specific to the terminal, and sends the private priority list specific to the terminal through special signaling. The special signaling may be an RRC Connection Release Request or an RRC Connection Reconfiguration.

Besides, the eNB calculates and generates a public priority list according to the obtained information such as cell bandwidth and service provider policy, and delivers the public priority list through broadcast channel. The features of different systems may be considered in calculating the public priority, for example, the order of priority of different systems may be set to: LTE>WCDMA>GSM.

EXAMPLE 1

It is assumed that a terminal is in a macro cell; one of the neighboring cells is a macro cell which is not overloaded, and the terminal supports all services provided by the neighboring cell; another neighboring cell is a home base station cell.

Table 1 sets out the information which is obtained by the eNB for calculating priority:

TABLE 1

| Factor | Priority level (0-5) and its meaning | Priority weight | Description |
|---|---|---|---|
| Subscription information | 0: Proper<br>3: Default<br>5: No subscription | 20% | If the terminal has not subscribed to the service of the cell, the cell is of the lowest priority or excluded |
| Terminal capabilities | 0: Proper<br>3: Default<br>5: Not supported | 20% | If the terminal capabilities do not support the service of the cell, the cell is of the lowest priority or excluded |
| Service provider's policy | 3: Default | 20% | Service provider policy |
| History service information | 3: Default | 10% | History service information |
| Network sharing | 3: Default | 10% | Whether the Network is shared |
| Cell bandwidth | 3: Default | 10% | Cell bandwidth |
| Support of broadcast and multicast services | 3: Default | 10% | Broadcast and multicast services |

1. The eNB calculates the priority of the neighboring macro cell according to the priority weight:
Priority level=0*20%+0*20%+3*20%+3*10%+3*10%+3*10%+3*10%=1.8; the priority level is rounded up to 2, which is relatively high.
The priority of another neighboring home base station cell is 0, which is the highest.
Therefore, the generated private priority list includes the priority levels of two cells, namely, (2, 0).

2. The eNB delivers the private priority list specific to the terminal through special signaling.

3. The eNB determines the public priority list to be (0, 0) according to the service provider policy, and delivers the public priority list to the terminal.

EXAMPLE 2

It is assumed that the terminal is in a macro cell. There are three neighboring cells, two of which are macro cells on different frequency layers in the LTE system; one of the two macro cells (cell 1) is overloaded, and the terminal capabilities support all the services provided by cell 1; the other neighboring cell (cell 2) is not overloaded; and there is a neighboring cell (cell 3) in the WCDMA system, and the terminal has not subscribed to the WCDMA service.

Table 2 sets out the information which is obtained by the eNB for calculating priority:

TABLE 2

| Factor | Priority level (0-5) and its meaning | Priority weight | Description |
|---|---|---|---|
| Subscription information | 0: Proper<br>3: Default<br>5: No subscription | 20% | If the terminal has not subscribed to the service of the cell, the cell is of the lowest priority or excluded |
| Terminal capabilities | 0: Proper<br>3: Default<br>5: Not supported | 20% | If the terminal capabilities do not support the service of the cell, the cell is of the lowest priority or excluded |
| Service provider policy | 3: Default | 20% | Service provider policy |
| History service information | 3: Default | 10% | History service information |
| Network sharing | 3: Default | 10% | Whether the Network is shared |
| Cell bandwidth | 3: Default | 10% | Cell bandwidth |
| Support of broadcast and multicast services | 3: Default | 10% | Broadcast and multicast services |

1. The eNB calculates the priority of the neighboring macro cell according to the priority weight:
Cell 1 on frequency layer: Because this cell is overloaded, the priority level is 5, which is the lowest;
Cell 2 on frequency layer: Priority level=0*25%+0*25%+3*20%+3*10%+3*10%+3*10%+3*10%=1.8; the priority level is rounded up to 2, which is relatively high; and
Cell 3: The terminal has not subscribed to the cell, and there list two processing approaches: One is to exclude, namely, the cell is blacklisted and the terminal is unable to reselect the cell; another is to set the priority level of the cell as 5, which is the lowest, in which case the terminal can reside on the cell, but can initiate no normal service except emergency calls for lack of subscription.
Therefore, the private priority list includes the priority levels of three cells, namely, (5, 2, 5).

2. The eNB delivers the private priority list specific to the terminal through special signaling.

3. The eNB determines the public priority list to be (0, 0, 3) according to the service provider policy, and delivers the public priority list to the terminal.

II. The network-side MME determines the private priority.
The MME obtains the information for calculating priority, including: terminal capabilities, subscription information, service provider policy, history service information, and whether the network is shared. According to such information, the MME calculates and generates a private priority list specific to the terminal. When the terminal enters the RRC_CONNECTED state, the MME delivers the private priority list specific to the terminal through special signaling. The special signaling may be a NAS message such as Attach process signaling or Tracking/Location/Route Area (TA/LA/RA) update process signaling.

Besides, the eNB calculates and generates a public priority list according to the obtained information such as cell bandwidth and service provider policy, and delivers the public priority list through broadcast channel.

For example, it is assumed that the terminal is in a macro cell; there are three neighboring cells, two of which are macro cells on different frequency layers in the LTE system. One of the two macro cells (cell 1) is overloaded, and the terminal capabilities support all the services provided by cell 1; the other neighboring cell (cell 2) is not overloaded; and there is a neighboring cell (cell 3) in the WCDMA system, while the terminal has not subscribed to the WCDMA service.

Table 3 sets out the information which is obtained by the MME for calculating priority:

TABLE 3

| Factor | Priority level (0-5) and its meaning | Priority weight | Description |
| --- | --- | --- | --- |
| Subscription information | 0: Proper<br>3: Default<br>5: No subscription | 25% | If the terminal has not subscribed to the service of the cell, the cell is of the lowest priority or excluded |
| Terminal capabilities | 0: Proper<br>3: Default<br>5: Not supported | 25% | If the terminal capabilities do not support the service of the cell, the cell is of the lowest priority or excluded |
| Service provider policy | 3: Default | 20% | Service provider policy |
| History service information | 3: Default | 10% | History service information |
| Network sharing | 3: Default | 10% | Whether the Network is shared or not |
| Support of broadcast and multicast services | 3: Default | 10% | Broadcast and multicast services |

1. The MME calculates the priority of the neighboring macro frequency layer or the system according to the priority weight:

Cell 1 on frequency layer: Because this cell is overloaded, the priority level is 5, which is the lowest;

Cell 2 on frequency layer: Priority level=0*25%+0*25%+3*20%+3*10%+3*10%+3*10%+3*10%=1.8; the priority level is rounded up to 2, which is relatively higher; and Cell 3: The cell is in a different system and the terminal has not subscribed to the cell, and there list two processing approaches: One is to exclude, namely, the cell is blacklisted and the terminal is unable to reselect the cell; another is to set the priority level of the cell to be 5, which is the lowest, in which case the terminal can reside on the cell, but can initiate no normal service except emergency calls for lack of subscription.

The MME generates a private priority list which includes the priority levels of three cells, namely, (5, 2, 5).

2. The MME delivers the private priority list specific to the terminal through special signaling.

3. The eNB determines the public priority list to be (0, 0, 3) according to the service provider policy, and delivers the public priority list to the terminal.

III. The terminal determines the private priority.

The network (including the eNB and the MME) obtains the relevant information. Such information may be the information inaccessible to the terminal, for example, cell bandwidth, service provider policy, and whether the network is shared. The network delivers the obtained information (optionally including the algorithm for calculating the priority) to the terminal through broadcast and/or special signaling. After receiving the above information, the terminal formulates a private priority list for cell reselection in view of the received information and the information stored by the terminal, for example, terminal capabilities, subscription information, history service information, mobility or history mobility information.

When the information received by the terminal includes an algorithm for calculating priority, the terminal may calculate the priority of the cell according to the algorithm delivered by the network. When the information received by the terminal does not include the algorithm for calculating priority, the terminal may calculate the priority of the cell according to its own algorithm.

For example, it is assumed that the terminal is in a macro cell; there are three neighboring cells, two of which are macro cells on different frequency layers in the LTE system are macro cells. One of the two cells (cell 1) is overloaded, and the terminal capabilities support all the services provided by the cell; the other neighboring cell (cell 2) is not overloaded; and there is a neighboring cell (cell 3) in the WCDMA system, yet the terminal has not subscribed to the WCDMA service.

The algorithm obtained by the terminal from the network calculates the priority according to the priority weight. Table 4 sets out the information parameters for calculating the priority:

TABLE 4

| Factor | Cell1 | Cell2 | Cell3 | Description |
| --- | --- | --- | --- | --- |
| Service provider policy | High (LTE) | High (LTE) | Medium (WCDMA) | Service provider policy |
| Network sharing | Supported | Supported | Not supported | Whether the network is shared or not |
| Cell bandwidth | 10 MHz | 20 MHz | 5 MHz | Cell bandwidth |

Table 5 sets out the information which is obtained by the terminal from the network, and the information stored by the terminal for calculating priority:

TABLE 5

| Factor | Priority level (0-5) and its meaning | Priority weight | Description |
| --- | --- | --- | --- |
| Subscription information | 0: Proper<br>3: Default<br>5: No subscription | 25% | If the terminal has not subscribed to the service of the cell, the cell is of the lowest priority or excluded |
| Terminal capabilities | 0: Proper<br>3: Default<br>5: Not supported | 25% | If the terminal capabilities do not support the service of the cell, the cell is of the lowest priority or excluded |
| Service provider policy | 3: Default | 20% | Service provider policy |
| History service information | 3: Default | 10% | History service information |
| Network sharing | 3: Default | 10% | Whether the network is shared |
| Support of broadcast and multicast services | 3: Default | 10% | Broadcast and multicast services |

1. According to the obtained parameter list and the algorithm for calculating priority in addition to the terminal's own parameters, the terminal calculates the priority level of the frequency layer and the system of the neighboring macro cell in view of the priority weight:

Cell 1 on frequency layer: Because this cell is overloaded, the priority level is 5, which is the lowest;

Cell 2 on frequency layer: Priority level=0*20%+0*20%+ 3*20%+3*10%+3*10%+3*10%+3*10%=1.8; the priority level is rounded up to 2, which is relatively higher; and Cell 3: The cell is in a different system and the terminal has not subscribed to the cell, and there list two processing approaches: One is to exclude, namely, the cell is blacklisted and the terminal is unable to reselect the cell; the other is to set the priority level of the cell to be 5, which is the lowest, in which case the terminal can reside on the cell, but can initiate no normal service except emergency calls for lack of subscription.

According to the calculated priority, the terminal generates a private priority list which includes the priority levels of three cells, namely, (5, 2, 5).

2. The eNB determines the public priority list to be (0, 0, 3) according to the service provider policy, and delivers the public priority list to the terminal.

IV. The eNB and the terminal determine the private priority jointly.

When the terminal enters the RRC_CONNECTED state, the eNB obtains the information required for calculating the priority. Such information includes the information stored by the eNB and the information obtained from the MME. For example, the information stored by the eNB includes the cell bandwidth information; and the information obtained by the eNB from the MME includes: terminal capability, subscription information, service provider policy, history service information, and whether the network is shared. According to the obtained information, or such information inaccessible to the terminal (for example, cell bandwidth, and service provider policy) among the obtained information, the eNB calculates out and generates a private priority list specific to the terminal, and sends the private priority list specific to the terminal through special signaling. The special signaling may be an RRC Connection Release Request or an RRC Connection Reconfiguration. According to the received priority list and the information stored by the terminal, the terminal calculates the private priority list.

Besides, the eNB calculates and generates a public priority list according to the obtained information such as cell bandwidth and service provider policy, and delivers the public priority list through broadcast channel. The features of different systems may be considered in calculating the public priority, for example, the order of priority of different systems may be set to: LTE>WCDMA>GSM.

For example, it is assumed that the terminal is in a macro cell; there are three neighboring cells, two of which are macro cells on different frequency layers in the LTE system. One of the two cells (cell 1) is overloaded, and the terminal capabilities support all the services provided by the cell; the other (cell 2) is not overloaded; and there is a neighboring cell (cell 3) in the WCDMA system, yet the terminal has not subscribed to the WCDMA service.

Table 6 sets out the information which is obtained by the eNB for calculating priority:

TABLE 6

| Factor | Priority level (0-5) | Priority weight | Description |
| --- | --- | --- | --- |
| Service provider policy | 3: Default | 50% | Service provider policy |
| Network sharing | 3: Default | 25% | Whether the network is shared |
| Cell bandwidth | 3: Default | 25% | Broadcast and multicast services |

1. The eNB calculates and generates a priority list according to the information inaccessible to the terminal.

Cell 1 on frequency layer: Because this cell is overloaded, the priority level is 5, which is the lowest;

Cell 2 on frequency layer: Priority level=3*50%+3*25%+ 3*25%=3; the priority level is medium; and Cell 3: The cell is in a different system and the terminal has not subscribed to the cell. There are two processing approaches: One is to exclude, namely, the cell is blacklisted and the terminal is unable to reselect the cell; another is to set the priority level of the cell to be 5, which is the lowest, in which case the terminal can reside on the cell, but can initiate no normal service except emergency calls for lack of subscription.

The MME generates a private priority list which includes the priority levels of three cells, namely, (5, 3, 5), and delivers the private priority list specific to the terminal.

2. It is assumed that the information stored in the terminal is shown in Table 7:

TABLE 7

| Factor | Priority level (0-5) | Priority weight | Description |
| --- | --- | --- | --- |
| Subscription information | 0: Proper<br>3: Default<br>5: No subscription | 20% | If the terminal has not subscribed to the service of the cell, the cell is of the lowest priority or excluded |
| Terminal capabilities | 0: Proper<br>3: Default<br>5: Not supported | 20% | If the terminal capabilities do not support the service of the cell, the cell is of the lowest priority or excluded |
| History service information | 3: Default | 10% | History service information |
| Support of broadcast and multicast services | 3: Default | 10% | Broadcast and multicast services |

The terminal calculates the final priority level according to the priority list delivered by the eNB and the information stored in the terminal.

Cell 1 on frequency layer: Because this cell is overloaded, the priority level is 5, which is the lowest;

Cell 2 on frequency layer: Priority level=0*20%+0*20%+3*10%+3*10%+3*40%=1.8; the priority level is rounded up to 2, which is relatively higher; and Cell 3: The cell is in a different system and the terminal has not subscribed to the cell, and there list two processing approaches: one is to exclude, namely, the cell is blacklisted and the terminal is unable to reselect the cell; the other is to set the priority level of the cell to be 5, which is the lowest, in which case the terminal can reside on the cell, but can initiate no normal service except emergency calls for lack of subscription.

The terminal generates a final private priority list which includes the priority levels of three cells, namely, (5, 2, 5).

V. The MME and the terminal jointly determine the private priority.

The MME obtains the information required for calculating priority. According to the obtained information or according to the information inaccessible to the terminal (for example, service provider policy, and network sharing) in the obtained information, the MME calculates and generates a private priority list specific to the terminal. When the terminal enters the RRC_CONNECTED state, the MME delivers the private priority list specific to the terminal through special signaling. The special signaling may be a NAS message such as Attach process signaling or TA/LA/RA update process signaling.

In the embodiments of the present invention, a network and/or a terminal determines the private priority of the cell, frequency, or system. When the network determines the private priority, the network delivers the determined private priority list specific to the terminal through special signaling. When the terminal and/or the network determines the private priority, the network delivers the information about the determined priority or the independently determined private priority list specific to the terminal; and the terminal can determine a private priority list according to the received information or the private priority list determined by the network in view of the information stored by the terminal. Therefore, relevant information is provided for the processes such as cell reselection and cell search, the power consumption caused by terminal measurement is reduced, and energy efficiency is accomplished. Further, the network may deliver the public priority list to the terminal through broadcast so that the terminal may combine the private priority level with the public priority level in the evaluation of cell reselection.

It is noted that in the foregoing embodiments, the algorithm for calculating priority is not limited to the weight-based algorithm; other algorithms such as function-based algorithms may also apply. In the function-based algorithms, various factors may be input into a function, and the corresponding priority level is output.

Moreover, in the foregoing solutions where the eNB or MME determines the priority level, when the eNB or MME delivers the private priority list specific to the terminal, a validity period (for example, one hour, or one day) of the private priority list and/or a validity scope (for example, valid only within this TA/LA/RA, or valid only in this cell) may be notified to the terminal. The validity period and/or the validity scope may also be sent together to the terminal as information in the private priority list. Once the validity period expires or the terminal leaves the validity scope, the terminal starts the public priority policy. The public priority policy may be sent by the MME or eNB to the terminal through special signaling, or sent by the eNB to the terminal through broadcast. When the terminal performs TA/LA/RA update or initiates a service again, the terminal obtains and uses the new private priority policy calculated and configured by the MME or eNB.

When cell reselection is required and the terminal is in idle mode, the terminal evaluates cell reselection to determine the cell to be reselected according to the private priority list of the cell, frequency or system, the exclusive conditions which currently affect cell reselection, or further according to the public priority list. In this way, it will assure the terminal to select a proper cell.

Figure 2:
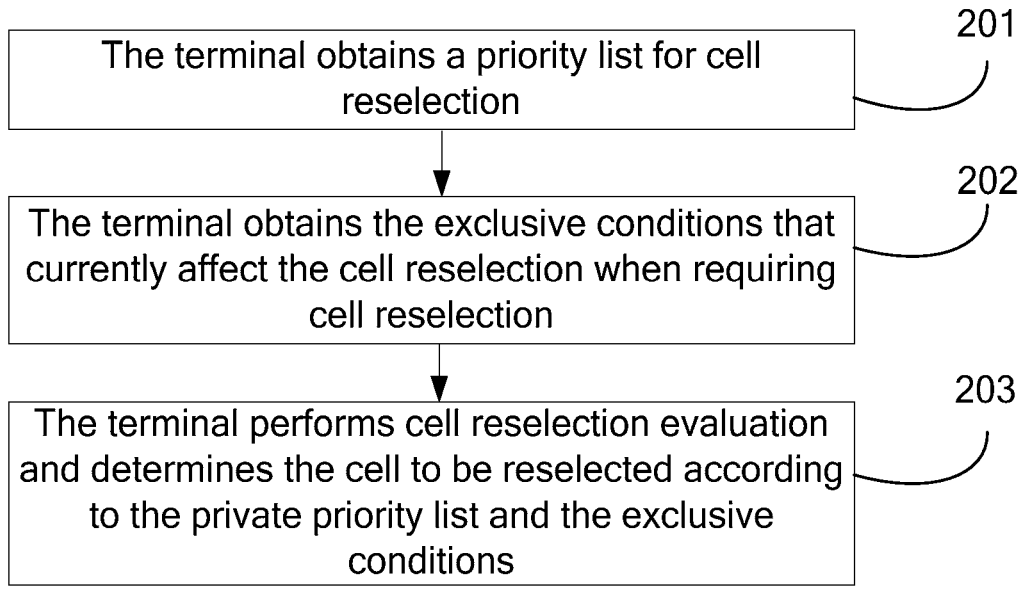
FIG. 2 is a flowchart of a cell reselection method in an embodiment of the present invention.

FIG. 2 is a flowchart of a cell reselection method in an embodiment of the present invention. The method includes the following:

Block 201: The terminal obtains a priority list for cell reselection.

For details, the description in the foregoing embodiments serves as a reference. The network and/or the terminal determines the private priority list of the terminal according to the information for calculating priority, and the network determines the public priority list and delivers it to the terminal through broadcast.

Block 202: When cell reselection is required, the terminal obtains the exclusive conditions that currently affect cell reselection. Such conditions include: home base station; or load of the cell, frequency or system; or combination thereof.

The network may broadcast the delivered load indication of the cell, frequency or system to obtain the load information. Preferably, the network delivers the load indication of the cell, frequency or system only when the load of the cell, frequency or system changes from normal to overload or from overload to normal. The network indicates the terminal in the cell through paging when the load of the neighboring cell, frequency or system changes (for example, when the load of the cell, frequency or system changes from normal to overload or from overload to normal).

Block 203: The terminal determines the cell to be reselected according to the private priority list and the exclusive conditions.

The terminal may perform cell reselection evaluation by considering only the private priority list instead of the public priority list, namely, according to the private priority list and the exclusive conditions. The terminal may also perform cell reselection evaluation by considering the public priority list and the exclusive conditions. Alternatively, the terminal may perform cell reselection evaluation by considering the private priority list and the public priority list, namely, according to the private priority list, the public priority list and the exclusive conditions to determine the cell to be reselected.

In practice, the terminal may set out the exclusive conditions (for example, home base station, and load information of the cell, frequency or system) in the priority-related factors separately, then check whether the private priority list carries the exclusive conditions. If the private priority list carries the exclusive conditions, the terminal considers the exclusive conditions first and then performs cell reselection evaluation according to the order of priority. The cell that meets the requirements is reselected, as detailed below with examples.

I. The terminal receives a public priority list and a private priority list.

It is assumed that the exclusive conditions are set out in Table 8:

TABLE 8

| Factor | Priority level (0-5) and its meaning | Description |
| --- | --- | --- |
| Home base station | Highest (0) | If a neighboring cell is a home base station accessible to the terminal, this cell is preferred; if the cell reselection criteria are fulfilled, this cell is preferred; otherwise, other factors are considered |
| Load (may include residing load and service load) | Lowest (5, in the case of overload) | If the neighboring cell, the frequency or the system is overloaded, the cell, the frequency or the system is of the lowest priority or excluded |
| Speed/migration information | | The terminal obtains its own speed and performs cell reselection evaluation in view of the priority |

EXAMPLE 1

It is assumed that a terminal is in a macro cell; one of the neighboring cells is a macro cell which is not overloaded, and the terminal supports all services provided by the neighboring cell; another neighboring cell is a home base station cell.

The private priority list obtained by the terminal is (2, 0), and the public priority list obtained is (0, 0). The public priority list is ignored, and the private priority list is applied to perform cell reselection evaluation.

(1) First, the neighboring home base station cell (whose priority level is 0) is measured and evaluated. According to the cell reselection criteria, if the cell fulfills the reselection criteria, the home base station cell is reselected; if it does not fulfill the reselection criteria, the cell of a lower priority level (for example, the neighboring macro cell whose priority level is 2) is further measured.

(2) The load indication of the neighboring cell or the frequency of the neighboring cell is obtained through broadcast. When the load indication indicates no overload, the cell reselection evaluation is performed according to the measured signal quality. If the signal quality of the neighboring cell fulfills the reselection criteria, the terminal reselects the neighboring cell which is a macro cell.

(3) In the cell reselection evaluation, the corresponding operations may be performed in view of the speed. For example, for the terminal of a high speed, the corresponding parameter (for example, a reselection timer "Treselection" or a Hysteresis value) is scaled through a spreading factor in the cell reselection evaluation so that the terminal can reselect the new cell more quickly.

EXAMPLE 2

It is assumed that the terminal is in a macro cell; there are three neighboring cells, two of which are macro cells on different frequency layers in the LTE system One of the two cells (cell 1) is overloaded, and the terminal capabilities support all the services provided by the cell; the other neighboring cell (cell 2) is not overloaded; and there is a neighboring cell (cell 3) in the WCDMA system, yet the terminal has not subscribed to the WCDMA service.

I. After obtaining the priority list, the terminal ignores the public priority list, and applies the private priority list (5, 2, 5) to perform cell reselection evaluation.

(1) First, the terminal checks for any home base station in the neighboring cells. If no home base station exists in the neighboring cells, the terminal continues evaluating according to the private priority list.

(2) The terminal measures the cell of a higher priority level (cell 2). If the signal quality of cell 2 fulfills the cell reselection criteria, the terminal reselects cell 2; otherwise, the terminal continues to measure the cell of lower priority (cell 1).

(3) In the cell reselection evaluation, further operations, for example, changing the spreading factor, may be performed in view of the speed.

II. The terminal takes all priority-related factors into account to obtain the priority level and perform cell reselection factor, namely, without setting out the exclusive conditions.

It is noted that such a method of determining priority is applicable not only to cell reselection, but also to cell selection. When the terminal performs cell selection, the terminal may prefer the residing cell according to the information stored in the terminal. If no information is stored, the terminal may measure the frequency-layer cell of higher priority first according to the broadcast priority level.

Figure 3:
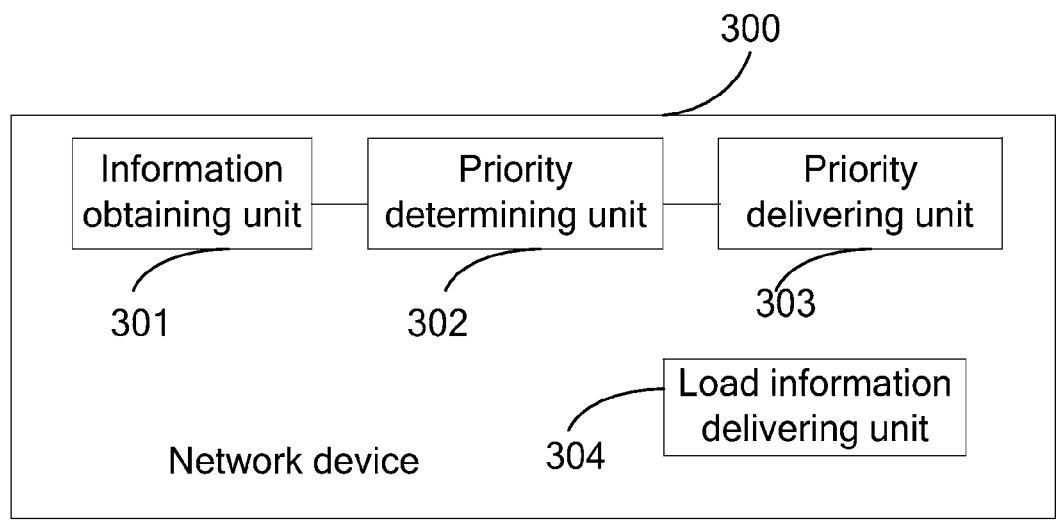
FIG. 3 shows a structure of a network device in a first embodiment of network device in the present invention.

A network device is disclosed in an embodiment of the present invention. As shown in FIG. 3, the network device 300 includes: an information obtaining unit 301, a priority determining unit 302, and a priority delivering unit 303.

The information obtaining unit 301 is adapted to obtain information for calculating priority.

The priority determining unit 302 is adapted to determine a private priority list according to the information obtained by the information obtaining unit 301.

The priority delivering unit 303 is adapted to deliver the private priority list through special signaling.

Further, the priority determining unit 302 is adapted to determine a public priority list according to the information obtained by the information obtaining unit 301. Accordingly, the priority delivering unit 303 is adapted to deliver the public priority list through broadcast.

The network device in this embodiment may further include a load information delivering unit 304, which is adapted to deliver the load information of the cell, frequency or system through broadcast.

Figure 4:
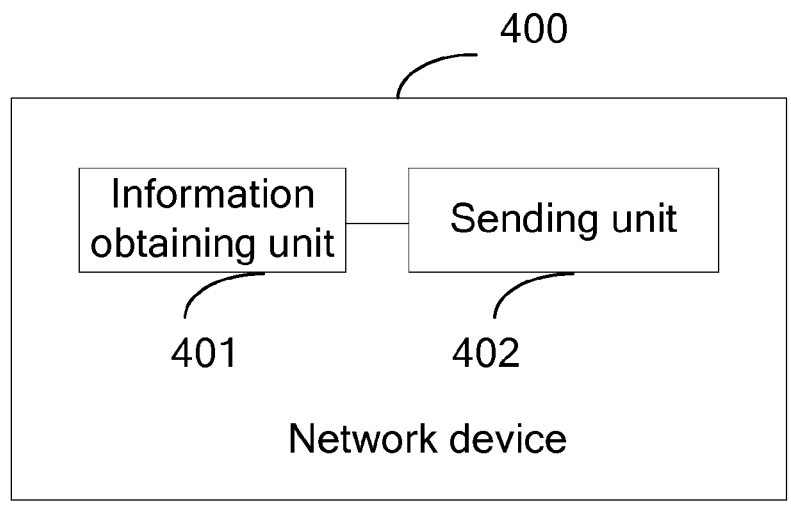
FIG. 4 shows a structure of a network device in a second embodiment of network device in the present invention.

The network device in another embodiment of the present invention is shown in FIG. 4. The network device 400 in this embodiment includes an information obtaining unit 401 and a sending unit 402.

The information obtaining unit 401 is adapted to obtain information for calculating priority.

The sending unit 402 is adapted to: deliver all or part of the information obtained by the information obtaining unit through broadcast and/or special signaling, and deliver the algorithm for calculating priority.

The network device in the foregoing two embodiments may be an eNB or MME in the LTE system.

Figure 5:
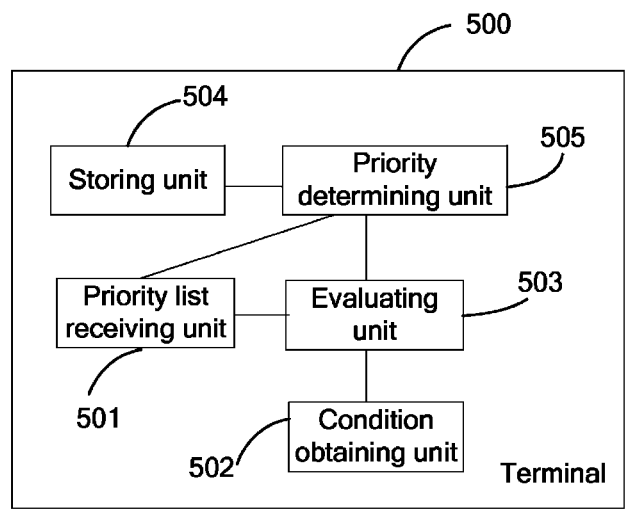
FIG. 5 shows a structure of a terminal in a first terminal embodiment in the present invention.

A terminal is disclosed in an embodiment of the present invention. As shown in FIG. 5, the terminal includes: a priority list receiving unit 501, a condition obtaining unit 502, and an evaluating unit 503.

The priority list receiving unit 501 is adapted to receive the private priority list from the network through special signaling.

The condition obtaining unit 502 is adapted to obtain exclusive conditions when cell reselection is required.

The evaluating unit 503 is adapted to determine the cell to be reselected according to the private priority list and the exclusive conditions.

The terminal in this embodiment may further include a storing unit 504 and a priority determining unit 505. The storing unit 504 is adapted to store information for calculating priority. The priority determining unit 505 is adapted to determine a new private priority list according to the private priority list received by the priority list receiving unit 501 and the information stored in the storing unit 504. In this way, the evaluating unit 503 determines the cell to be reselected according to the new private priority list and the exclusive conditions.

In the terminal in this embodiment, the priority list receiving unit 501 can be further adapted to receive the public priority list from the network through broadcast. Accordingly, the evaluating unit 503 can be further adapted to determine the cell to be reselected according to the private priority list, the public priority list, and the exclusive conditions.

Figure 6:
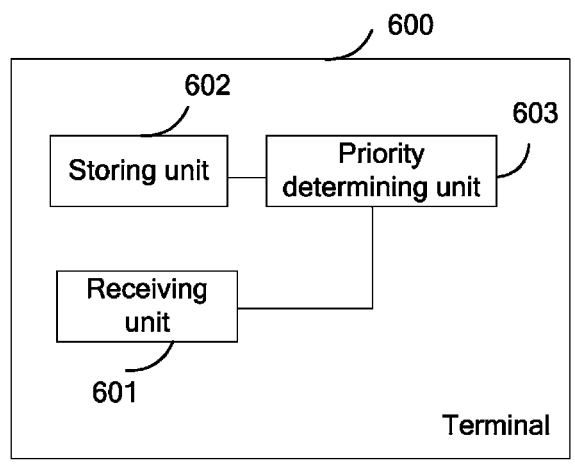
FIG. 6 shows a structure of a terminal in a second terminal embodiment in the present invention.

A terminal in an embodiment of the present invention is shown in FIG. 6. The terminal 600 includes: a receiving unit 601, a storing unit 602, and a priority determining unit 603.

The receiving unit 601 is adapted to receive the information delivered by the network for calculating priority through broadcast or special signaling.

The storing unit 602 is adapted to store the information for calculating priority.

The priority determining unit 603 is adapted to determine a private priority list according to the information received by the receiving unit 601 and the information stored by the storing unit 602.

The receiving unit 601 is further adapted to receive the algorithm delivered by the network for calculating priority. In this way, the priority determining unit 603 can determine the private priority list according to the information received by the receiving unit 601, the algorithm for calculating priority, and the information stored by the storing unit 602.

The terminal in this embodiment may further include a condition obtaining unit and an evaluating unit (not illustrated in the figure). The condition obtaining unit is adapted to obtain exclusive conditions when cell reselection is required. The evaluating unit is adapted to determine the cell to be reselected according to the private priority list determined by the priority determining unit 603 and the exclusive conditions.

Besides, the receiving unit 601 in this embodiment may further be adapted to receive the public priority list from the network through broadcast. Accordingly, the evaluating unit may further be adapted to determine the cell to be reselected according to the private priority list, the public priority list, and the exclusive conditions.

It is understandable to those skilled in the art that all or part of the blocks in the foregoing embodiments may be performed through hardware instructed by a program. The program may be stored in a computer-readable storage medium such as ROM/RAM, magnetic disk, and compact disk.

Detailed above are the embodiments of the present invention. Although the invention is described through some exemplary embodiments, the invention is not limited to such embodiments. It is apparent that those skilled in the art can make various modifications and variations to the invention without departing from the invention. The invention is intended to cover the modifications and variations provided that they fall in the scope of protection defined by the following claims or their equivalents.

What is claimed is:

1. A system, comprising an evolved Node B (eNB) and a Mobile Management Entity (MME) in communication with the eNB, wherein the MME is configured to:
   obtain information for calculating priority;
   determine a private priority list specific to a terminal according to the information obtained by the MME; and
   deliver the private priority list specific to the terminal to the eNB, and wherein the eNB is configured to:
   obtain information for calculating priority;
   determine a public priority list according to the information obtained by the eNB; and
   deliver the public priority list and the private priority list to the terminal,
   wherein delivery of the public priority list to the terminal is via broadcast and delivery of the private priority list to the terminal is not via broadcast.

* * * * *